United States Patent
Angell et al.

[11] Patent Number: 5,855,809
[45] Date of Patent: Jan. 5, 1999

[54] ELECTROCHEMICALLY STABLE ELECTROLYTES

[75] Inventors: Charles Austen Angell, Mesa; Sheng-Shui Zhang, Tucson; Kang Xu, Tempe, all of Ariz.

[73] Assignee: Arizona Board Of Regents, Tempe, Ariz.

[21] Appl. No.: 748,008

[22] Filed: Nov. 12, 1996

Related U.S. Application Data

[60] Provisional application No. 60/006,437, Nov. 13, 1995.
[51] Int. Cl.⁶ .................... H01B 3/20; C01B 25/10; C01B 21/06; C01B 25/14
[52] U.S. Cl. .................... 252/62.2; 252/574; 252/575; 423/300; 423/302; 423/303; 423/351
[58] Field of Search .................... 252/62.2, 574, 252/575; 423/300, 302, 303, 351

[56] References Cited

U.S. PATENT DOCUMENTS

| | | | |
|---|---|---|---|
| 3,231,327 | 1/1966 | Seglin et al. ............ | 423/300 |
| 4,116,891 | 9/1978 | Dieck et al. ............ | 549/456 |
| 4,123,503 | 10/1978 | Snyder et al. ............ | 423/300 |
| 5,021,308 | 6/1991 | Armand et al. ............ | 252/62.2 X |

OTHER PUBLICATIONS

Xu et al., "Room Temperature Inorganic 'Quasi–Molten Salts' as Alkali–Metal Electrolytes," *J. Electrochem. Soc.*, Nov. 1996, vol. 143, No. 11, pp. 3548–3554.

*Primary Examiner*—Donald R. Valentine
*Attorney, Agent, or Firm*—Morrison & Foerster LLP

[57] ABSTRACT

This invention relates generally to inorganic ionic liquids which function as electrolytes and do not crystallize at ambient temperature. More specifically, this invention is directed to quasi-salt inorganic ionic liquids which comprise the reaction product of a strong Lewis acid with an inorganic halide-donating molecule. This invention is further directed to quasi-salt inorganic ionic liquid mixtures which comprise combinations of electrolyte additives and quasi-salt inorganic ionic liquids. These quasi-salt inorganic ionic liquid mixtures are useful electrolytes.

43 Claims, 10 Drawing Sheets

Cyclic voltammogram of PSCl−0.8AlCl$_3$−2NaAlCl$_4$ melt
*PSCl=trichlorophosphazosulfuryl chloride Solid Line = $[AlCl_4]^- - [SO_2NPCl_3]^+$
Dotted Line = $x[NaAlCl_4] + (1-x)[AlCl_4]^- - [SO_2NPCl_3]^+$
  $x = 0.40$ x in $xNaAlCl_4-(1-x)[Cl_3PNSO_2Cl-AlCl_3]$

| T | (°C) |
|---|---|
| △ | 100 |
| ■ | 50 |
| □ | 25 |
| ▼ | 0 |
| ▽ | -10 |
| ● | -20 |
| ○ | -30 |

$[AlCl_4]^- - [SO_2NPCl_3]^+$ $x[NaAlCl_4] + (1-x)[AlCl_4]^- - [SO_2CH_3]^+$ 0.39 [NaAlCl$_4$] + 0.61 [AlCl$_4$]$^-$ – [SO$_2$NPCl$_3$]$^+$

SCAN RATE = 10 mV/s

REFERENCE ELECTRODE = Na$^+$/Na

WORKING AND COUNTER ELECTRODE = Pt

ROOM TEMPERATURE 0.39 [NaAlCl$_4$] + 0.61 [AlCl$_4$]$^-$ – [SO$_2$NPCl$_3$]$^+$

SCAN RATE = 10 mV/s

REFERENCE ELECTRODE = Na$^+$/Na

WORKING AND COUNTER ELECTRODE = Pt

ROOM TEMPERATURE $x[LiAlCl_4] + (1-x)[AlCl_4]^- - [Cl_2PNCH_3]^+$ $x[LiAlCl_4] + (1-x)[AlCl_4]^- - [Cl_2PNCH_3]^+$ $0.1[LiAlCl_4] + 0.90[AlCl_4]^- - [CH_3C(O)]^+$ $x[LiAlCl_4] + (1-x)[AlCl_4]^- - [Cl_2PNPCl_2]^+$ x = 0.50    X[LiAlCl$_4$]$^-$ + [BCl$_4$]$^-$-[CH$_3$CH$_2$NCl$_2$]$^+$

Li/0.30LiAlCl$_4$ — 0.70[AlCl$_4$]$^-$-[SO$_2$NPCl$_3$]/LiMn$_2$O$_4$

ELECTROCHEMICALLY STABLE ELECTROLYTES

GOVERNMENT LICENSING RIGHTS

The U.S. Government has a paid-up license in this invention and the right in limited circumstances to require the patent owner to license others on reasonable terms as provided for by the terms of DOE Contract Number DE-FG02-93ER14378 awarded by the Department of Energy.

RELATED APPLICATION

The present application is a nonprovisional application which claims priority rights under 35 U.S.C. § 119(e) based on U.S. Provisional patent application Ser. No. 60/006,437 filed on Nov. 13, 1995.

INTRODUCTION

This invention relates generally to inorganic ionic liquids which function as electrolytes and do not crystallize at ambient temperature. More specifically, this invention is directed to quasi-salt inorganic ionic liquids which comprise the reaction product of a strong Lewis acid with an inorganic halide-donating molecule. This invention is further directed to quasi-salt inorganic ionic liquid mixtures which comprise combinations of electrolyte additives and quasi-salt inorganic ionic liquids. These quasi-salt inorganic ionic liquid mixtures are useful electrolytes.

BACKGROUND OF THE INVENTION

Electrolytes are materials which are typically used to conduct an electric current in an electrochemical device. Ionic liquids are useful electrolytes because they contain high concentrations of mobile charged ions, and therefore may conduct substantial electric currents through movement of these charged ions.

It is advantageous for an ionic liquid electrolyte to (1) be stable in the liquid phase and have high conductivity at temperatures varying from room temperature down to −40° C.; (2) be capable of dissolving large mole fractions of alkali metal salts; (3) be stable in the presence of alkali metals; (4) have a wide electrochemical window; and (5) enable reversible electrochemical deposition of alkali metals under charging conditions and stripping of alkali metals under discharging conditions in an electrochemical cell.

In order to obtain these desirable properties, many researchers have focused on certain organic cation-containing salts such as tetraalkyl ammonium tetrachloroaluminates or imidazolium tetrachloroaluminates because they are liquids at room temperature. Mixtures of certain of these compounds with alkali tetrachloroaluminates may be liquid at room temperature and exhibit some desirable properties such as high conductivity. However, these mixtures do not have practical application because they have organic cations which decompose in the presence of alkali metals.

SUMMARY OF THE INVENTION

The present invention relates to quasi-salt inorganic ionic liquids which comprise the reaction product of a strong Lewis acid with an inorganic halide-donating molecule. Preferable inorganic halide-donating molecules are inorganic molecules which contain a —$NPX_3$ group, an —$SO_2X$ group, a —C(O)X group, or a combination of these groups wherein X is a halogen atom. More preferable inorganic halide-donating molecules include the following:

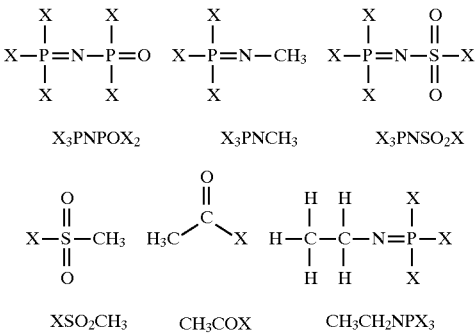

$X_3PNPOX_2$  $X_3PNCH_3$  $X_3PNSO_2X$ $XSO_2CH_3$  $CH_3COX$  $CH_3CH_2NPX_3$ wherein X is a halogen atom.

Preferable strong Lewis acids include $AlCl_3$ and $BCl_3$.

The present invention also relates to quasi-salt inorganic ionic liquid mixtures which further comprise electrolyte additives combined with the quasi-salt inorganic ionic liquid. Electrolyte additives provide alkali cations to the ionic liquid. Preferable electrolyte additives are salts such as $LiAlCl_4$, $LiN(SO_2CF_3)_2$, $LiSO_3CF_3$, $NaAlCl_4$, $NaN(SO_2CF_3)_2$ and $NaSO_3CF_3$. Most preferable electrolyte additives are $NaAlCl_4$ and $LiAlCl_4$.

The quasi-salt inorganic ionic liquid mixtures of the present invention are superior to electrolytes having organic cation-containing ionic liquids because the quasi-salt inorganic ionic liquids of the present invention (1) are stable in the liquid phase and have high conductivity at temperatures varying from room temperature down to −40° C.; (2) are capable of dissolving large mole fractions of alkali metal salts; (3) are stable in the presence of alkali metals; (4) have a wide electrochemical windows; and (5) enable reversible electrochemical deposition of alkali metals under charging conditions and stripping of alkali metals under discharging conditions in an electrochemical cell.

The present invention further relates to electrochemical devices which incorporate the above-described quasi-salt inorganic ionic liquid mixtures as electrolytes. The quasi-salt inorganic ionic liquid mixtures are especially useful electrolytes for rechargeable electrochemical devices.

These and other features, aspects and advantages of the present invention will become better understood with reference to the following description, and accompanying drawings.

DESCRIPTION OF THE PREFERRED EMBODIMENTS

Figure 1:
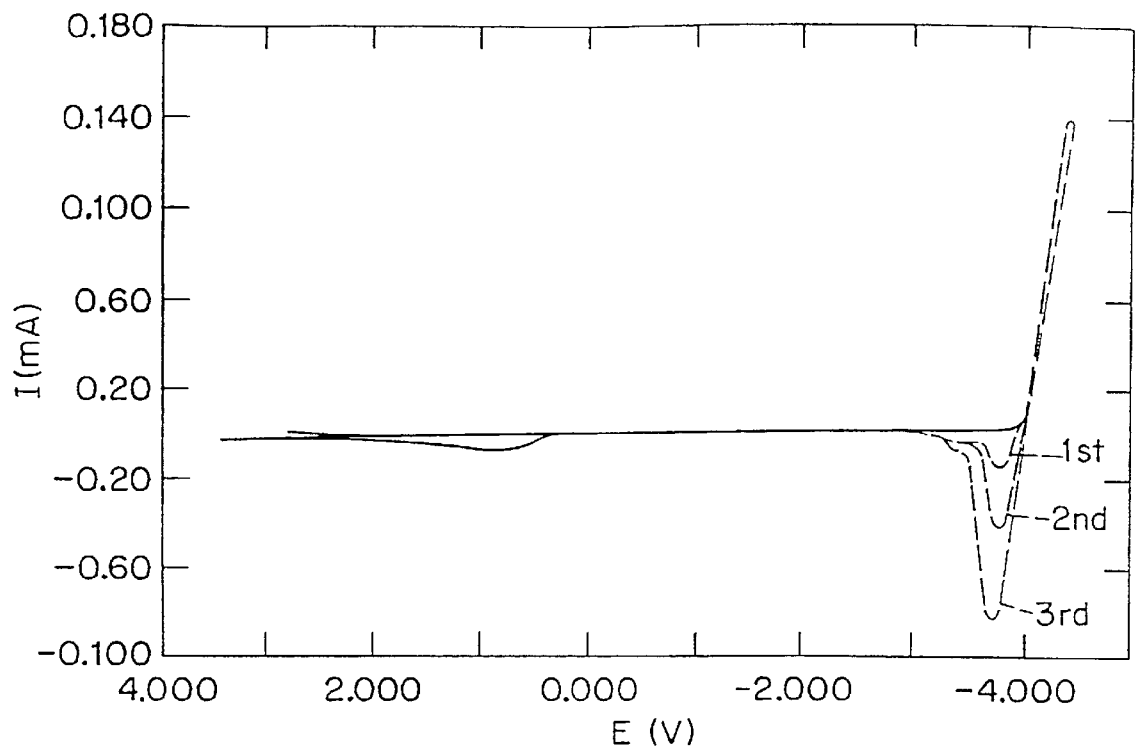
FIG. 1 is a cyclic voltammogram scanning between 3.5 V and −4.5 V versus a platinum pseudo-reference electrode for a quasi-salt inorganic ionic liquid mixture comprising a mole ratio of 2.0 parts $LiAlCl_4$ mixed with the reaction product of 0.8 parts $AlCl_3$ and 1.0 part $Cl_3PNSO_2Cl$.

The term "inorganic halide-donating molecule" is defined to mean a molecule which contains at most three carbon-carbon bonds and at least one halogen atom. The term "inorganic halide-donating molecule" is further defined to mean a molecule capable of reacting with a strong Lewis acid by substantially donating a halogen atom. The term "inorganic halide-donating molecule" encompasses both small non-polymerized inorganic molecules and polymerized inorganic molecules.

The term "quasi-salt inorganic ionic liquid" is defined to mean a reaction product of a strong Lewis acid with an inorganic halide-donating molecule.

The term "electrolyte additive" is defined to mean an ion-generating material (i.e. a salt).

The term "quasi-salt inorganic ionic liquid mixture" is defined to mean an electrolyte additive dissolved in a quasi-salt inorganic ionic liquid.

Quasi-salt inorganic ionic liquids according to the present invention are prepared by reacting a strong Lewis acid with an inorganic halide-donating molecule as shown in example 2. Preferable inorganic halide-donating molecules are inorganic molecules which contain a PCl$_3$ group, an SO$_2$Cl group, a C(O)Cl group, or a combination of these groups. More preferable inorganic halide-donating molecules include the following:

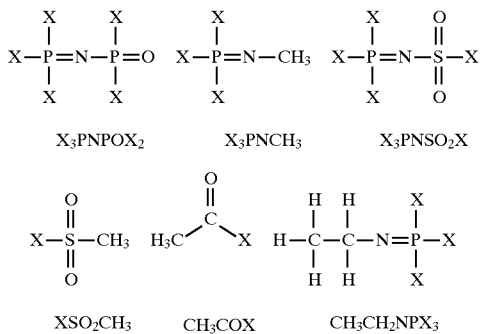

wherein X is a halogen atom. The inorganic halide-donating molecules CH$_3$COCl and ClSO$_2$CH$_3$ are commercially available from Aldrich. Example 1 shows a procedure for the synthesis of Cl$_3$PNSO$_2$Cl. Cl$_3$PNSO$_2$F may also be synthesized in a manner analogous to Example 1.

Preferable strong Lewis acids include BCl$_3$, AlCl$_3$, SbCl$_3$ and FeCl$_3$. Among these, AlCl$_3$ and BCl$_3$ are the most preferred. Example 2 shows a procedure whereby a quasi-salt inorganic ionic liquid is synthesized by reacting AlCl$_3$ with Cl$_3$PNSO$_2$Cl.

The invention described herein is not limited to any one theory of operation. For a discussion of the theory regarding the structure of the quasi-salt inorganic ionic liquids, see *Room Temperature Inorganic "Quasi-Molten Salts" as Alkali-Metal Electrolytes*, Angell et al., J. Electrochem. Soc., vol. 143 (November 1996), pp. 3548–3554 which is hereby incorporated by reference.

It is further preferable to dissolve large amounts of electrolyte additives such as alkali metal cation sources in the above-described quasi-salt inorganic ionic liquids to form quasi-salt inorganic ionic liquid mixtures. Preferable electrolyte additives are salts such as $LiAlCl_4$, $LiN(SO_2CF_3)_2$, $LiSO_3CF_3$, $NaAlCl_4$, $NaN(SO_2CF_3)_2$ and $NaSO_3CF_3$. Most preferable alkali metal cation sources include $LiAlCl_4$ and $NaAlCl_4$. In one embodiment of the invention up to about 75 mole percent $NaAlCl_4$ was added to the reaction product of equal molar parts of $Cl_3PNSO_2Cl$ and $AlCl_3$. At such high concentrations, $NaAlCl_4$ forms a homogeneous mixture with the trisubstituted phosphazosulfuryllium cation ionic liquid, but it is probably not "dissolved" in the proper sense of the term. Instead, the quasi-salt inorganic ionic liquid may more properly be described as "plasticizing," or simply mixing with the $NaAlCl_4$.

The quasi-salt inorganic ionic liquids formed by this reaction are advantageous electrolyte solvents partly because they are liquids at room temperature, and typically do not crystallize at temperatures down to about –20° C., but may become vitreous at substantially lower temperatures.

The quasi-salt inorganic ionic liquids according to the present invention have wide electrochemical windows, and therefore are useful over a wide range of voltages. As shown in FIGS. 2, 3, 6 and 8, these voltage windows vary between about 4 to 5 volts. Moreover, as shown in FIGS. 4, 5, 7 and 10–15, these liquids have very high conductivities, typically from $10^{-3}$–$10^{-4}$ $Scm^{-1}$ at ambient temperature. The highest room temperature conductivities are achieved in quasi-salt inorganic ionic liquid mixtures having more than 30 mole percent electrolyte additive. Quasi-salt inorganic ionic liquids and inorganic ionic liquid mixtures according to the invention are useful as electrolytes for all manner of electrochemical devices including, but not limited to devices such as rechargeable electrochemical cells, fuel cells, batteries and gas sensors.

Figure 16:
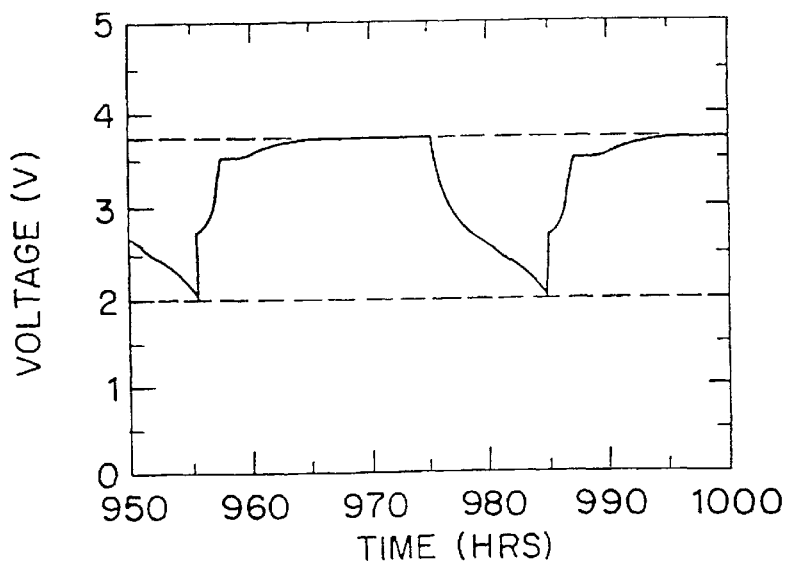
FIG. 16 is a plot of cell voltage versus time for a Li/LiMn$_2$O$_4$ electrochemical cell which utilizes as an electrolyte, a trisubstituted phosphazosulfuryllium cation ionic liquid mixture wherein the ionic liquid consists of a mole ratio of 30 mole percent LiAlCl$_4$ mixed with the reaction product of equal molar parts AlCl$_3$ and Cl$_3$PNSO$_2$Cl.

Electrochemical cells incorporating trisubstituted phosphazosulfuryllium cation ionic liquid or liquid mixture electrolytes exhibit excellent reversibility over multiple discharge-charge-discharge cycles as shown in FIG. 16.

Ionic conductivities of the quasi-salt inorganic ionic liquids and quasi-salt inorganic ionic liquid mixtures according to the present invention were determined using twin platinum electrode dip-type cells with cell constants of about 1–2 $cm^{-1}$. The complex impedance plots were generated using a HEWLETT-PACKARD Model HP4192A-Frequency Analyzer. Measurements were automated to cover a predetermined temperature range at a sequence of temperatures controlled by a EUROTHERM temperature controller.

Figure 8:
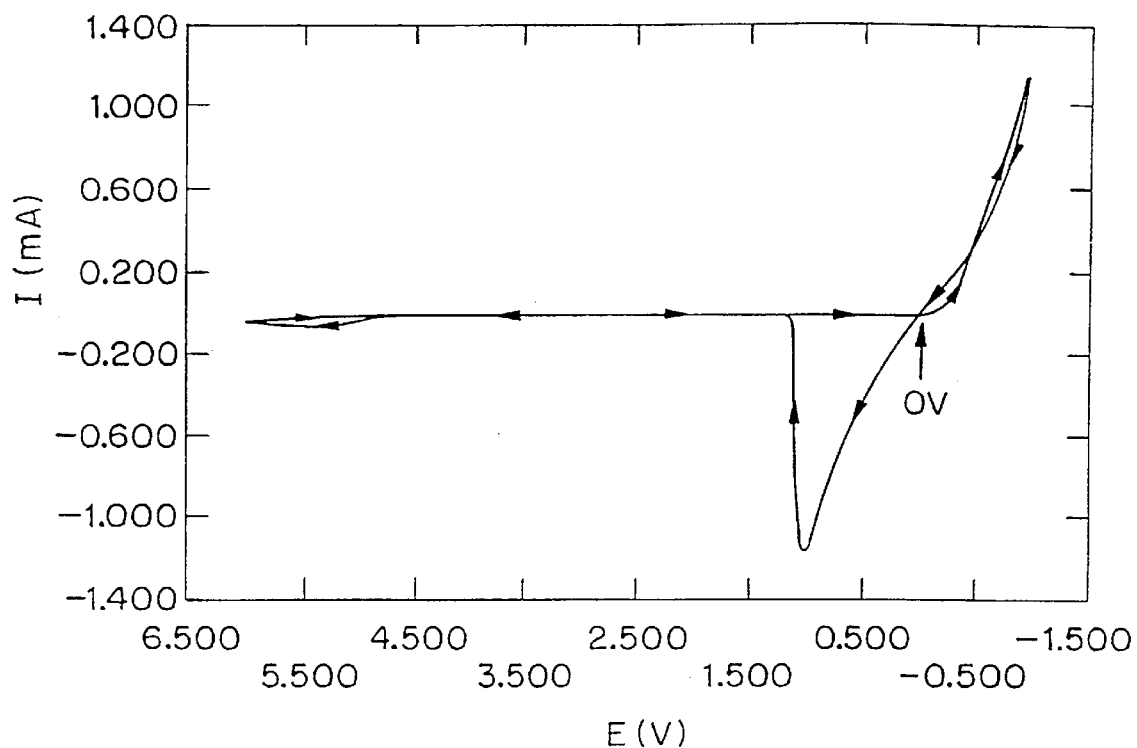
FIG. 8 is a cyclic voltammogram scanning between 6.0 V and −1.0 V versus a Na/Na$^+$ electrode for a quasi-salt inorganic ionic liquid mixture comprising 39 mole percent NaAlCl$_4$ and 61 mole percent reaction product of equal molar parts AlCl$_3$ and H$_3$CSO$_2$Cl.
Figure 8:
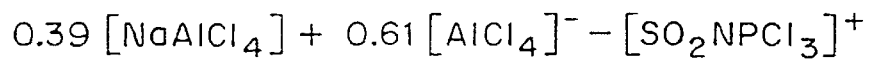
Figure 9:
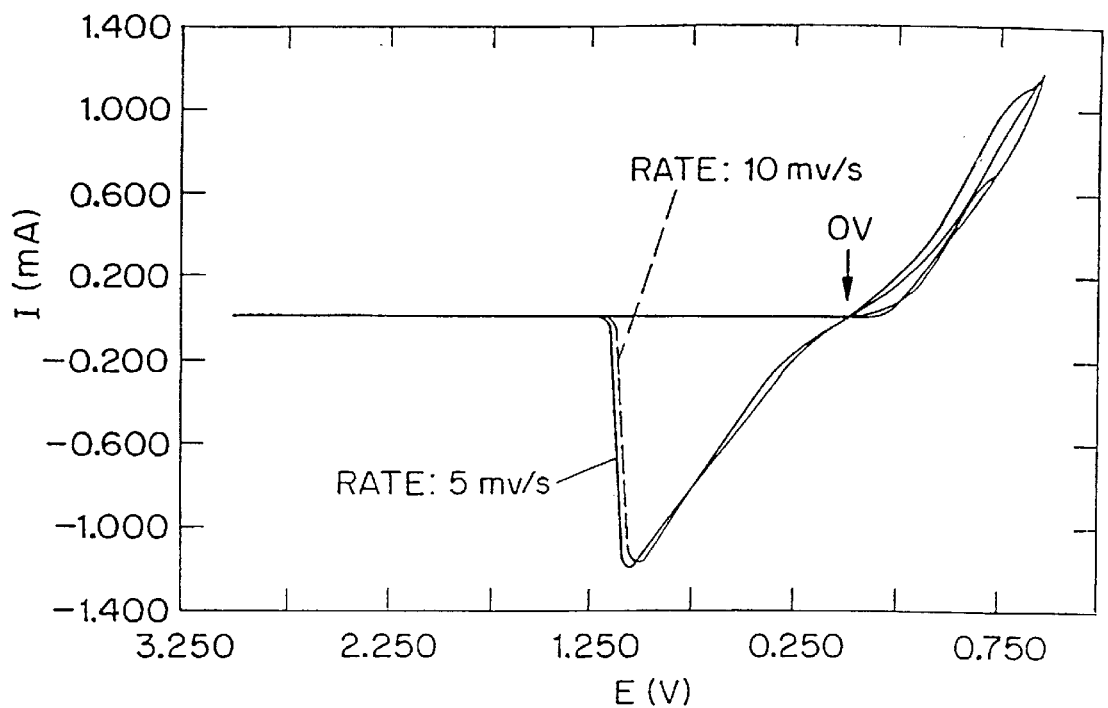
FIG. 9 is an overlay of two cyclic voltammograms scanning at 5 mV/s and 10 mV/s between 3.0 V and −0.80 V versus a Na/Na$^+$ electrode for a quasi-salt inorganic ionic liquid mixture which comprises 39 mole percent NaAlCl$_4$ and 61 mole percent reaction product of equal molar parts of AlCl$_3$ and H$_3$CSO$_2$Cl.
Figure 10:
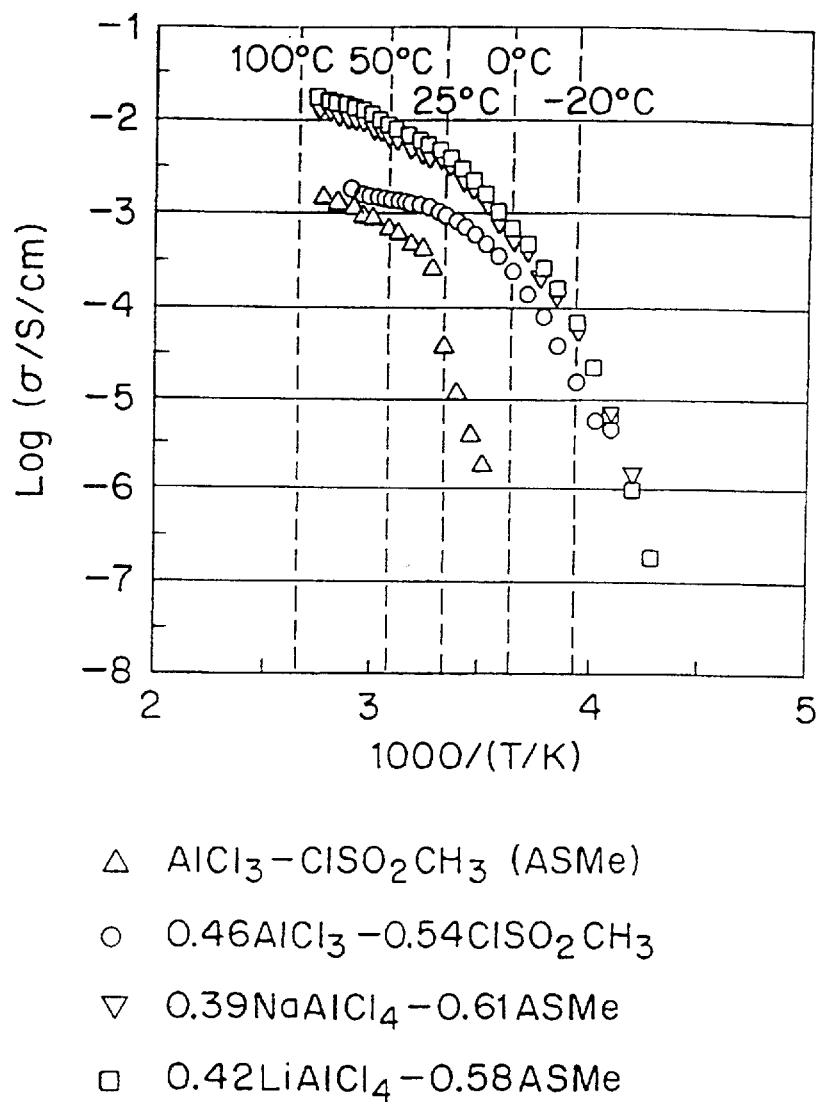
FIG. 10 is an overlay plot which shows the reciprocal temperature (K) dependence of log conductivity (Scm$^{-1}$) for (a) a quasi-salt inorganic ionic liquid which comprises the reaction product of equal molar parts of AlCl$_3$ and H$_3$CSO$_2$Cl; (b) a quasi-salt inorganic ionic liquid which comprises the reaction product of 46 mole percent AlCl$_3$ and 54 mole percent H$_3$CSO$_2$Cl; (c) a quasi-salt inorganic ionic liquid mixture which comprises 39 mole percent NaAlCl$_4$ and 61 mole percent reaction product of equal molar parts of AlCl$_3$ and H$_3$CSO$_2$Cl; and (d) a quasi-salt inorganic ionic liquid mixture which comprises 42 mole percent LiAlCl$_4$ and 58 mole percent reaction product of equal molar parts of AlCl$_3$ and H$_3$CSO$_2$Cl.
Figure 11:
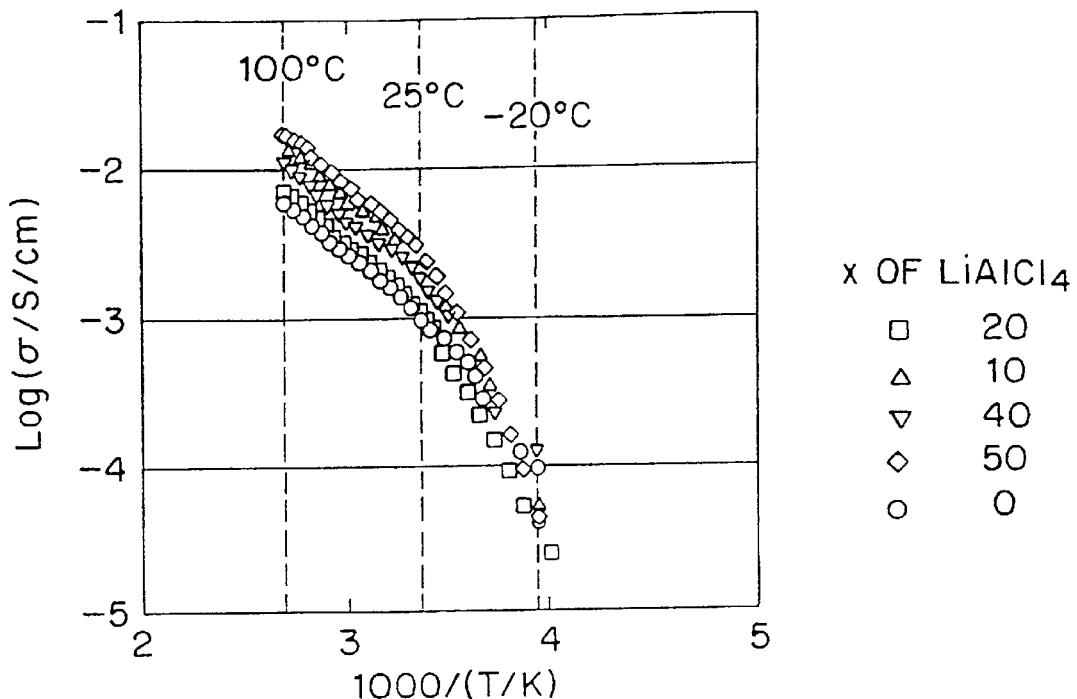
FIG. 11 is an overlay plot which shows the reciprocal temperature (K) dependence of log conductivity (Scm$^{-1}$) for quasi-salt inorganic ionic liquid mixtures comprising various mole fractions of LiAlCl$_4$ dissolved in the reaction product of equal molar parts of AlCl$_3$ and Cl$_3$PNCH$_3$.

The cyclic voltammograms shown in FIGS. 1–3, 6, and 8–9 were obtained using a PAR potentiometer. All scans were performed at room temperature. FIG. 9 shows that the reversibility of the Li deposition/stripping process is almost independent of scan rate between 5 and 10 mV/s.

Specific embodiments in accordance with the present invention will now be set forth in detail. These examples are intended to be illustrative, and the invention is not limited to the materials or amounts set forth in these embodiments.

EXAMPLE 1

Synthesis of an Inorganic Halide-Donating Molecule $Cl_3PNSO_2Cl$ was synthesized by the following procedure: 546.5 grams (2.62 moles) of $PCl_5$ (purified by sublimation of commercial product obtained from the Aldrich Chemical Company) and 127.14 grams (1.31 moles) of $NH_2SO_3H$ (Aldrich, 99.8 percent), were ground and mixed in a dry box and transferred to a 1000 ml flask equipped with a condenser, a nitrogen-inlet and an HCl-absorbing device. Under a flowing nitrogen atmosphere, the flask was heated in a water bath to near 100° C. until the above-mentioned solid reagents completely liquified. Most of the $POCl_3$ was removed by vacuum-distillation at a maximum temperature of 110° C. Then the remaining gold-colored oil was left to crystallize at room temperature. The crystallized product was washed several times with dry n-hexanes and recrystallized at about 5° C. The resultant product crystallized slowly to form pale yellow needle crystals and had a melting point of about 32° C. $\delta_{31p}$=–18.7 ppm (80% $H_3PO_4$ as external reference).

EXAMPLE 2

Figure 6:
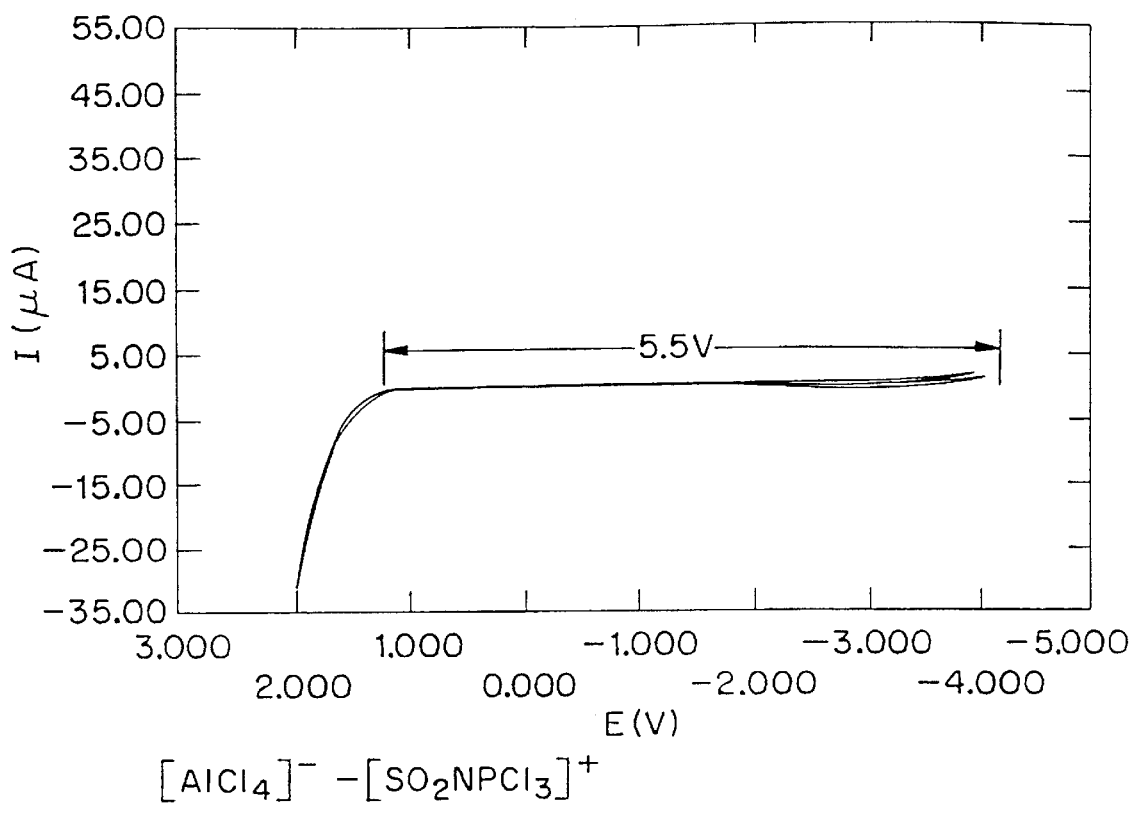
FIG. 6 is a cyclic voltammogram scanning between 2.0 V and −4.5 V versus a platinum pseudo-reference electrode for a quasi-salt inorganic ionic liquid which comprises the reaction product of equal molar parts of AlCl$_3$ and Cl$_3$PNSO$_2$Cl.

Synthesis of a Quasi-Salt Inorganic Ionic Liquid $Cl_3PNSO_2Cl$ prepared according to Example 1 was reacted with $AlCl_3$ by the following procedure. In a nitrogen-filled dry-box, 2.85 grams (0.021 moles) of $AlCl3$ (Aldrich, 99.9 percent) were slowly added to 5.0 grams (0.021 moles) of $Cl_3PNSO_2Cl$. In an exothermic reaction, a yellow viscous liquid product was formed. FIG. 6 shows a cyclic voltammogram of this inorganic ionic liquid. The cyclic voltammogram shown in FIG. 6 further indicates that this liquid has a wide electrochemical window of about 5.5 volts.

EXAMPLE 3

Synthesis of a Quasi-Salt Inorganic Liquid Mixture Comprising $LiAlCl_4$

A quasi-salt inorganic ionic liquid mixture was prepared by the following procedure. First, $LiAlCl_4$ was prepared by the following process. In a nitrogen-filled dry box, equal molar parts of dried LiCl (Aldrich, 99.99 percent) and $AlCl_3$ along with 0.5 grams of aluminum wire (Alfa, 99.99%) were ground and fitted into a pyrex tube. A piece of aluminum wire (99.99%, Alfa) was also placed in the pyrex tube to ensure an acid-free product would be produced. The pyrex tube and its contents were flame sealed under vacuum, placed in an oven, and heated to 200° C. After all the solids melted, the tube was cooled to room temperature and broken inside the nitrogen-filled dry box. The product, $LiAlCl_4$, was a white powder.

This $LiAlCl_4$ product was slowly added to the yellow viscous liquid product prepared according to Example 2. This mixture was optionally heated to 100° C. to accelerate formation of a solution. The resultant quasi-salt inorganic ionic liquid mixture was a yellow viscous liquid. FIG. 1 shows a cyclic voltammogram for this mixture wherein the mixture consists of a mole ratio of 2.0 parts $LiAlCl_4$ mixed with the reaction product of 0.8 parts $AlCl_3$ and 1.0 part $Cl_3PNSO_2Cl$. FIG. 1 shows a positive current flow corresponding to Li deposition at about –4.0 V versus a platinum pseudo-reference electrode, and a subsequent negative peak corresponding to stripping of the deposited alkali metal back into the solution. More of the alkali metal was stripped back into solution with repeated scans (marked as 1st, 2nd and 3rd in FIG. 1).

EXAMPLE 4

Synthesis of a Quasi-Salt Inorganic Liquid Mixture Comprising $NaAlCl_4$

A quasi-salt inorganic ionic liquid mixture was prepared by the following procedure. First, $NaAlCl_4$ was prepared by the following process. In a nitrogen-filled dry box, dried NaCl (Aldrich, 99.99 percent) and $AlCl_3$ along with 0.5 grams of aluminum wire (Alfa, 99.99%) were ground and fitted into a pyrex tube. The pyrex tube and its contents were flame sealed under vacuum, placed in an oven, and heated to 200° C. After all the solids melted, the tube was cooled to room temperature and broken inside the nitrogen-filled dry box. The product, $NaAlCl_4$, was a white crystalline powder.

Figure 2:
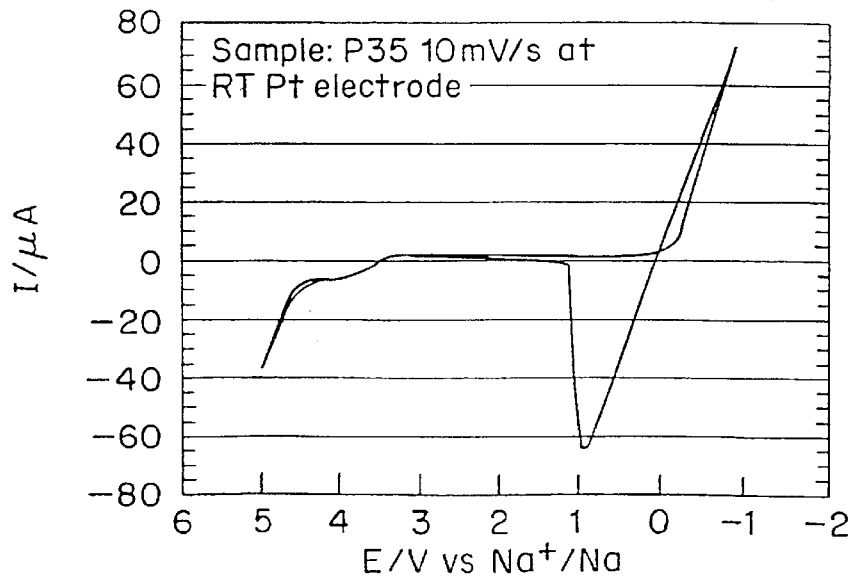
FIG. 2 is a cyclic voltammogram scanning between 5.0 V and −0.75 V versus a $Na/Na^+$ electrode for a quasi-salt inorganic ionic liquid mixture comprising a mole ratio of 2.0 parts $NaAlCl_4$ dissolved in the reaction product of 0.8 parts $AlCl_3$ and 1.0 part $Cl_3PNSO_2Cl$.

This $NaAlCl_4$ product was slowly added to the yellow viscous liquid product prepared according to Example 2. This mixture was optionally heated to 100° C. to accelerate formation of a solution. The resultant quasi-salt inorganic ionic liquid mixture was a yellow viscous liquid. FIG. 2 shows a cyclic voltammogram for this mixture wherein the mixture consists of a mole ratio of 2.0 parts $NaAlCl_4$ mixed with the reaction product of 0.8 parts $AlCl_3$ and 1.0 part $Cl_3PNSO_2Cl$. FIG. 2 shows a positive current flow corresponding to Na deposition at about −0.3 V versus a $Na/Na^+$ reference electrode, and a subsequent negative peak corresponding to sodium stripping back into the solution as the potential is reversed.

Several further quasi-salt inorganic ionic liquid mixtures were analogously prepared by: adding $NaAlCl_4$ to the reaction product of $AlCl_3$ and $ClSO_2CH_3$; adding $LiAlC_4$ to the reaction product of $AlCl_3$ and $ClSO_2CH_3$; adding $LiAlCl_4$ to the reaction product of $AlCl_3$ and $C_3PNCH_3$; adding $LiAlCl_4$ to the reaction product of $AlCl_3$ and $CH_3COCl$; adding $LiAlCl_4$ to the reaction product of $AlCl_3$ and $Cl_3PNPOCl_2$; adding $LiAlCl_4$ to the reaction product of $BCl_3$ in hexane and $CH_3CH_2NPCl_3$.

EXAMPLE 5

Figure 3:
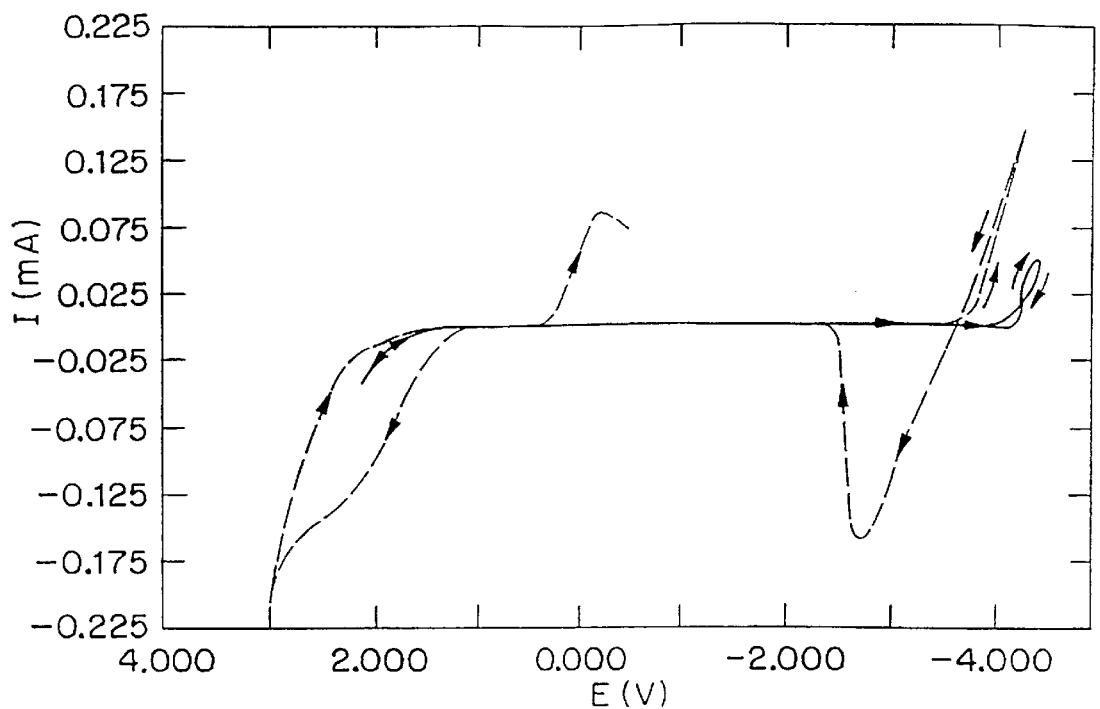
FIG. 3 shows an overlay of two cyclic voltammograms scanning between 3.0 V and −4.0 V versus a platinum pseudo-reference electrode for (1) a quasi-salt inorganic ionic liquid which comprises the reaction product of equal molar parts of $AlCl_3$ and $Cl_3PNSO_2Cl$ (solid line); and (2) a quasi-salt inorganic ionic liquid mixture which comprises 40 mole percent $NaAlCl_4$ dissolved in the same quasi-salt inorganic ionic liquid (dotted line).

Comparison of Cyclic Voltammograms for Ouasi-Salt Inorganic Ionic Liquids and Liquid Mixtures FIG. 3 shows an overlay of two cyclic voltammograms. The solid line corresponds to a cyclic voltammogram for the quasi-salt inorganic ionic liquid prepared according to Example 2. The dotted line corresponds to the quasi-salt inorganic ionic liquid mixture prepared according to Example 4 ($Cl_3PNSO_2Cl$), with the modification that the mole fraction of $NaAlCl_4$ was 0.4.

FIG. 8 shows a cyclic voltammogram obtained for a quasi-salt inorganic ionic liquid mixture comprising 39 mole percent $NaAlCl_4$ dissolved in 61 mole percent of the reaction product of equal molar parts $AlCl_3$ and $ClSO_2CH_3$. FIGS. 3 and 8 demonstrate that sodium may be reversibly deposited and stripped using these wide electrochemical window solutions. FIG. 8 further shows that the quasi-salt inorganic ionic liquid mixture is stable at potentials at least 0.5 V negative of $Na^+$, and is stable at positive voltages to about the same degree as $Na^+$.

EXAMPLE 6

Measurement of the Dependence of Conductivity Versus Temperature for Various Ouasi-Salt Inorganic Ionic Liquid Mixtures The temperature dependence of conductivity was measured for each of the quasi-salt solutions listed in Example 4. FIGS. 4, 10, 13, 14 and 15 show that conductivity increases with temperature for all the solutions. The highest room temperature conductivities are observed in FIG. 13, which shows a conductivity above $10^{-2.5} Scm^{-1}$ for a quasi-salt inorganic ionic liquid mixture which comprises 10 mole percent $LiAlCl_4$ dissolved in the reaction product of equal molar parts of $AlCl_3$ and $CH_3COCl$.

EXAMPLE 7

Figure 5:
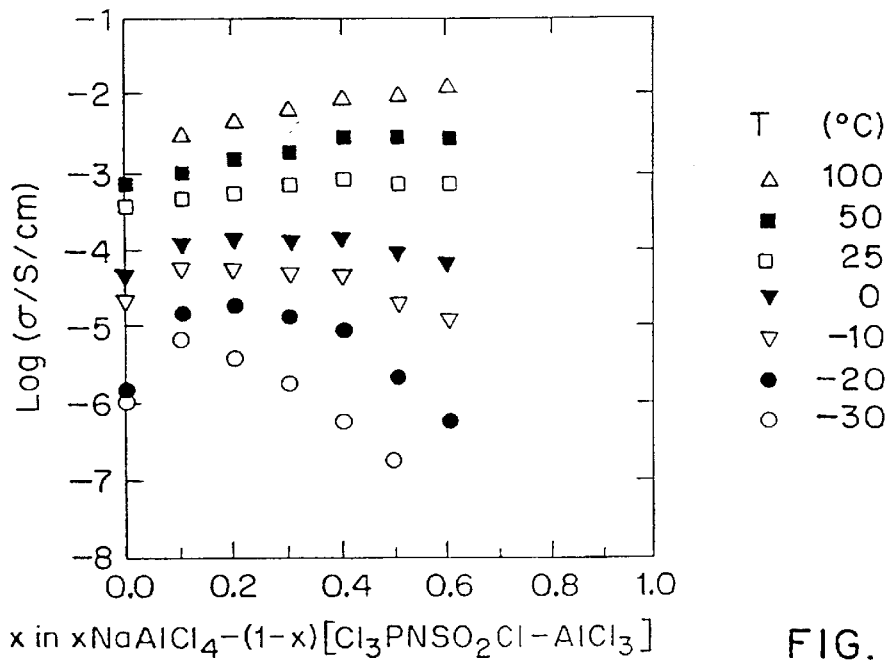
FIG. 5 is an overlay plot which shows for several specific temperatures, the dependence of log conductivity (Scm$^{-1}$) versus mole fraction of NaAlCl$_4$ for quasi-salt inorganic ionic liquid mixtures comprising from 0 to 60 mole percent of NaAlCl$_4$ dissolved in the reaction product of equal molar parts of AlCl$_3$ and Cl$_3$PNSO$_2$Cl.
Figure 4:
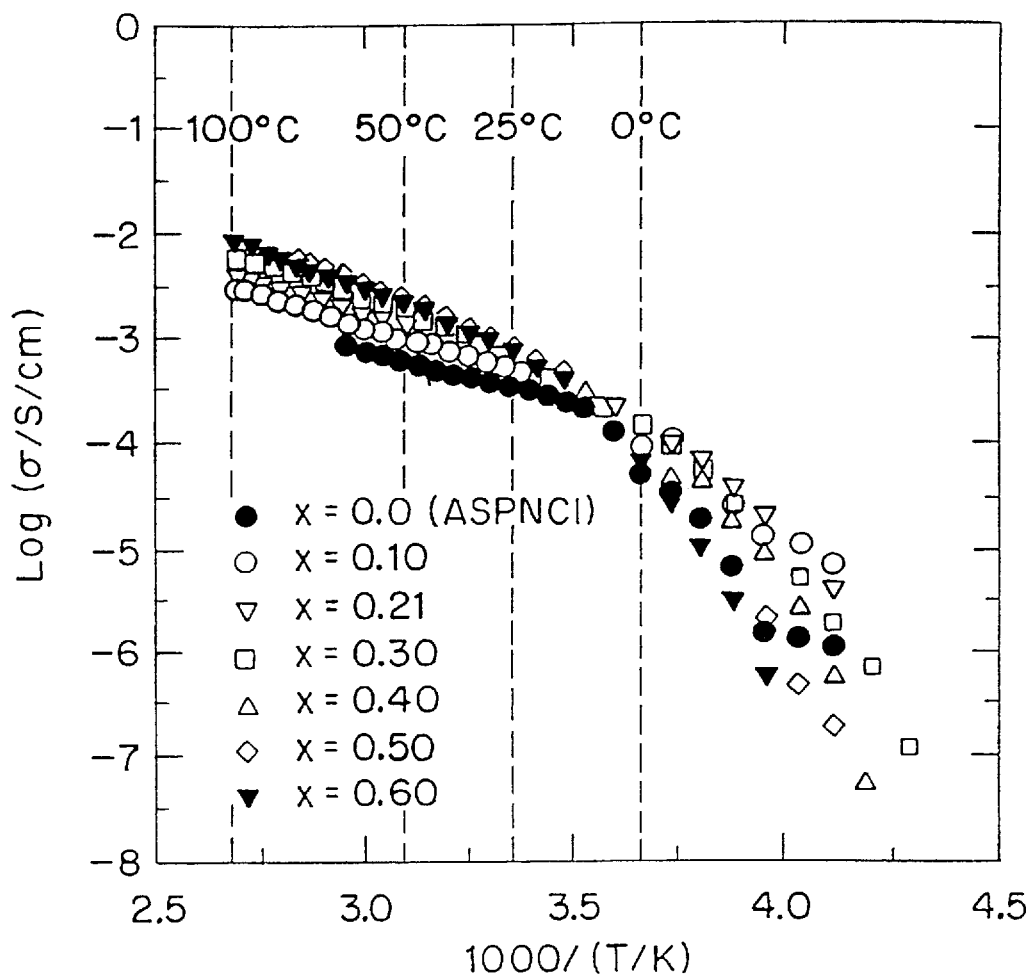
FIG. 4 is an overlay plot which shows the reciprocal temperature (K) dependence of log conductivity (Scm$^{-1}$) for quasi-salt inorganic ionic liquid mixtures comprising various mole fractions of NaAlCl$_4$ dissolved in the reaction product of equal molar parts of AlCl$_3$ and Cl$_3$PNSO$_2$Cl.
Figure 7:
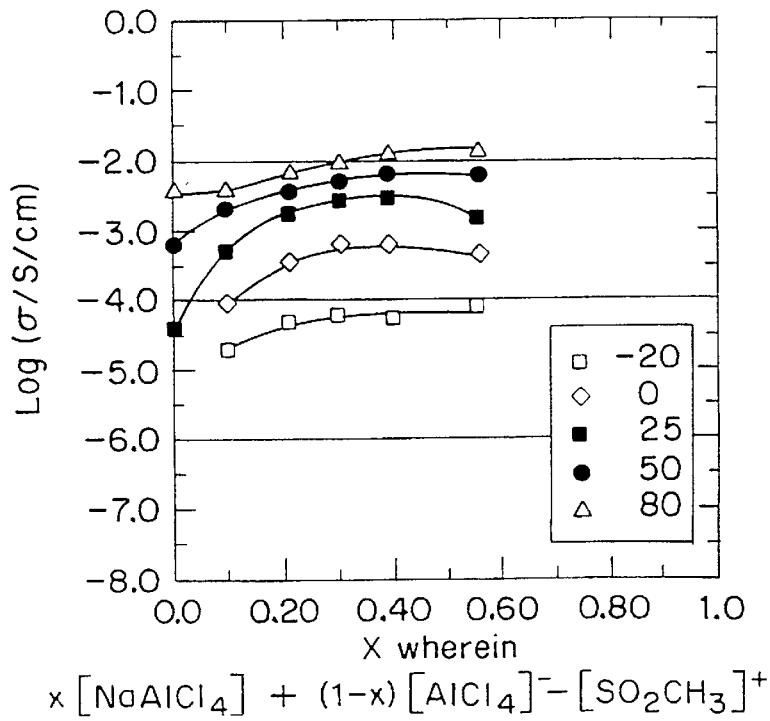
FIG. 7 is an overlay plot which shows for several specific temperatures, the dependence of log conductivity (Scm$^{-1}$) versus mole fraction of NaAlCl$_4$ for quasi-salt inorganic ionic liquid mixtures comprising from 0 to 50 mole percent of NaAlCl$_4$ dissolved in the reaction product of equal molar parts of AlCl$_3$ and ClSO$_2$CH$_3$.
Figure 12:
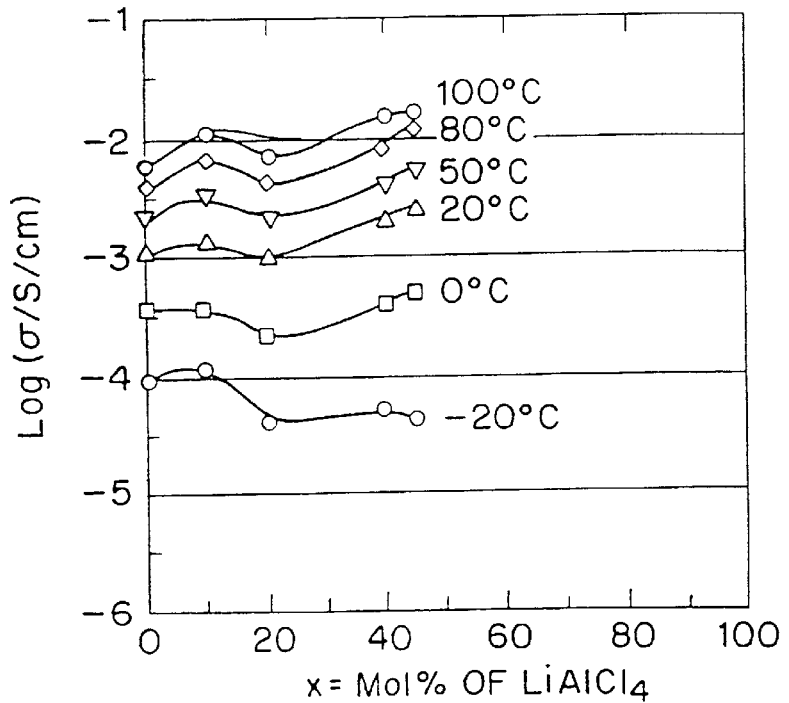
FIG. 12 is an overlay plot which shows for several specific temperatures, the dependence of log conductivity (Scm$^{-1}$) versus mole fraction of LiAlCl$_4$ for quasi-salt inorganic ionic liquid mixtures comprising from 0 to 45 mole percent of LiAlCl$_4$ dissolved in the reaction product of equal molar parts of AlCl$_3$ and Cl$_3$PNCH$_3$.
Figure 13:
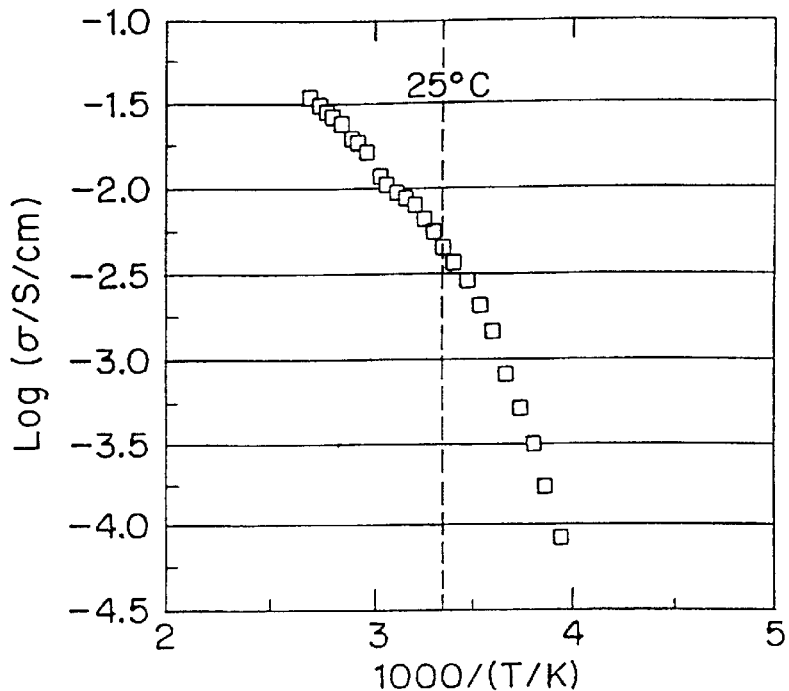
FIG. 13 is a plot which shows the reciprocal temperature (K) dependence of log conductivity (Scm$^{-1}$) for a quasi-salt inorganic ionic liquid mixture which comprises 10 mole percent LiAlCl$_4$ dissolved in the reaction product of equal molar parts of AlCl$_3$ and CH$_3$COCl.
Figure 14:
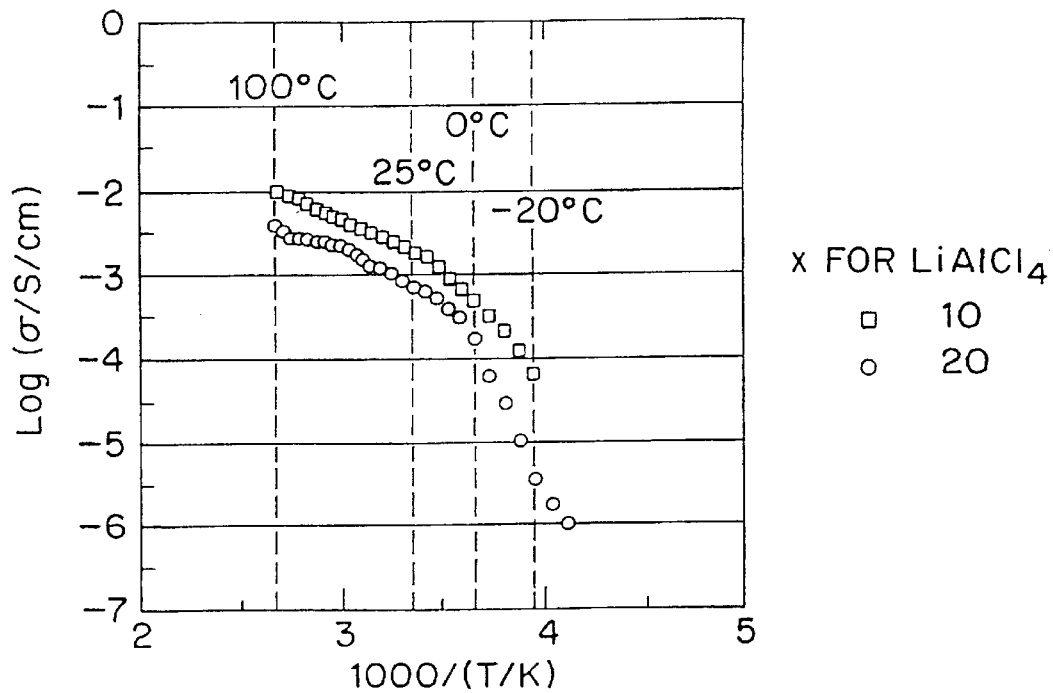
FIG. 14 is an overlay plot which shows the reciprocal temperature (K) dependence of log conductivity (Scm$^{-1}$) for quasi-salt inorganic ionic liquid mixtures comprising 10 and 20 mole percent of LiAlCl$_4$ dissolved in the reaction product of equal molar parts of AlCl$_3$ and Cl$_3$PNPOCl$_2$.
Figure 15:
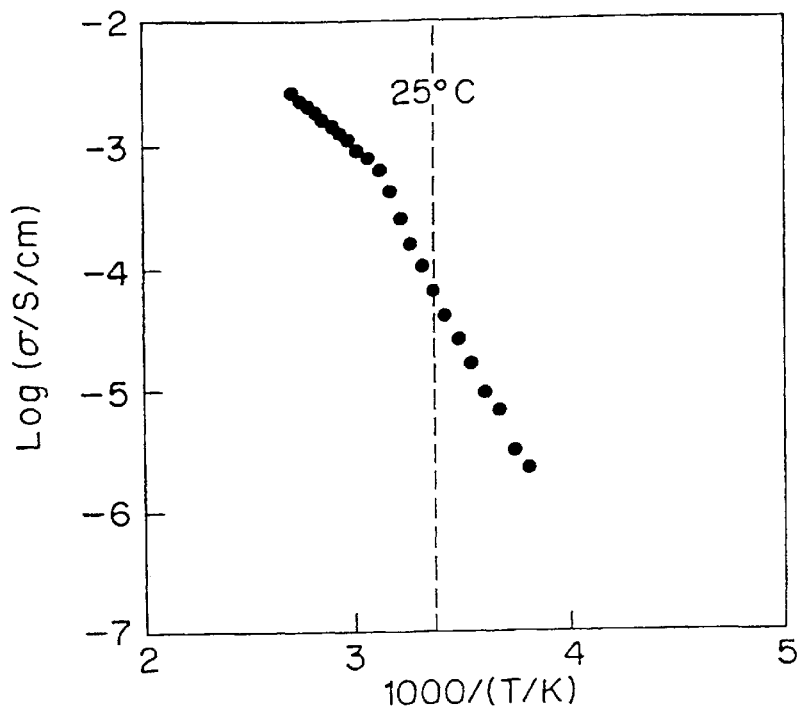
FIG. 15 is a plot which shows the reciprocal temperature (K) dependence of log conductivity (Scm$^{-1}$) for a quasi-salt inorganic ionic liquid which comprises the reaction product of equal molar parts of BCl$_3$ and CH$_3$CH$_2$NPCl$_3$.

Measurement of the Dependence of Conductivity Versus Mole Fraction of Electrolyte Additive for Differing Temperatures The dependence of conductivity versus mole fraction of electrolyte additive was determined for quasi-salt inorganic ionic liquid mixtures comprising the reaction product of $NaAlCl_4$ and $Cl_3PNSO_2Cl$ (FIG. 5), $NaAlCl_4$ and $ClSO_2CH_3$ (FIG. 7), and $LiAlCl_4$ and $Cl_3PNCH_3$ (FIG. 12). FIGS. 5 and 7 show a maximum for room temperature conductivity between 25 and 50 mole percent electrolyte additive.

EXAMPLE 8

Rechargeable Electrochemical Cell with an Electrolyte Composition Which Comprises A Ouasi-Salt Inorganic Ionic Liquid Mixture A $Li/LiMn_2O_4$ electrochemical cell was constructed using a Li foil anode and a cathode made from $LiMnO_4$, carbon black and a binder separated by an electrolyte containing a lithium-containing ionic liquid mixture analogous to Example 3, with the modification that it contains 40 mole percent $LiAlCl_4$. FIG. 16 shows a voltage versus time plot for several discharge-charge-discharge cycles. The charging and discharging current densities shown in FIG. 16 were fixed at 0.1 $mAcm^{-2}$. FIG. 16 shows that an electrochemical cell with an electrolyte comprising a quasi-salt inorganic ionic liquid mixture according to the present invention can be reversibly charged and discharged over at least two complete cycles. This cell was subsequently cycled 50 times and no decrease in capacity was observed.

EXAMPLE 9

Synthesis of $Cl_3P=NCH_3$ 200 g of $PCl_5$ (0.96 mol) and 64.75 g of dried $CH_3NH_2HCl$ (0.96 mol) were ground and mixed together in 200 ml of chlorobenzene, which was then heated to reflux under $N_2$-atmosphere. The reaction was completed in 5 h. When the mixture cooled, the product precipitated in the form of white needle crystals. The crystals were separated by filtration and subsequent washing with toluene. After being dried under vacuum, the crystal, were further purified by sublimation at ca. 150° C. under vacuum. The final refined product is snow-white needles with mp ~178° C., $\delta_{1H}$=3.02 ppm (triplet); $\delta_{13C}$=32.2 ppm (singlet); $\delta_{31P}$=−78.3 ppm (heptet)(80% $H_3PO_4$ as external reference).

EXAMPLE 10

Synthesis of $Cl_3P=NPOCl_2$ 300 g of $PCl_5$ (1.44 mol) and 47.55 g of dried $(NH_4)_2SO_4$ (0.36 mol) were ground, mixed together, and then heated up to 150° C. in an oil-bath under $N_2$-flow. 3 hours later, the mixture has completely liquefied. Most of the low-boilding side-products were then removed by vacuum distillation. The final product was distilled at 160° C. under 0.5 mm Hg. The product is a clear viscous liquid which slowly crystallized at room temperature. $\delta_{31P}$=−2.0 and −10.5 ppm (doublet) (80% $H_3PO_4$ as external reference).

EXAMPLE 11

Synthesis of N-Ethyl-imidodichlorophosphoryl tetrachloroborate $[CH_3CH_2N=PCl_2]+[BCl_4]^-$ 36.10 grams of $CH_3CH_2NH_2.BF_3$ (0.32 mol) and 200.0 g of $PCl_5$ (0.96 mol) were reacted in a similar manner as described in Examples 9 and 10. After 5 hours, excess PCl$_5$ was removed by filtration and volatile side products were removed through vacuum distillation. The final product, which was a golden-color oil, slowly crystalized from the remanant. The crystals had a melting point of 40°–50° C.

We claim:

1. A quasi-salt inorganic ionic liquid mixture which comprises an electrolyte additive dissolved in a quasi-salt inorganic ionic liquid, wherein said quasi-salt inorganic ionic liquid comprises the reaction product of a strong Lewis acid and an inorganic halide-donating molecule, wherein said inorganic halide-donating molecule is selected from the group consisting of:

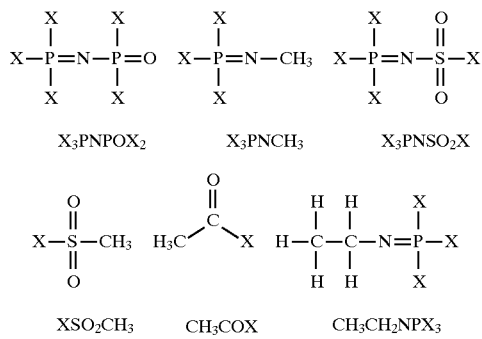

X$_3$PNPOX$_2$    X$_3$PNCH$_3$    X$_3$PNSO$_2$X

XSO$_2$CH$_3$    CH$_3$COX    CH$_3$CH$_2$NPX$_3$ wherein X is a halogen atom.

2. A quasi-salt inorganic ionic liquid mixture according to claim 1, wherein said strong Lewis acid is selected from the group consisting of AlCl$_3$, BCl$_3$, SbCl$_3$ and FeCl$_3$.

3. A quasi-salt inorganic ionic liquid mixture according to claim 2, wherein said electrolyte additive is selected from the group consisting of LiAlCl$_4$, LiN(SO$_2$CF$_3$)$_2$, LiSO$_3$CF$_3$, NaAlCl$_4$, NaN(SO$_2$CF$_3$)$_2$ and NaSO$_3$CF$_3$.

4. A quasi-salt inorganic ionic liquid mixture according to claim 3, wherein said strong Lewis acid is selected from the group consisting of AlCl$_3$ and BCl$_3$, and the electrolyte additive is selected from the group consisting of LiAlCl$_4$ and NaAlCl$_4$.

5. A quasi-salt inorganic ionic liquid mixture according to claim 2, wherein said electrolyte additive is an alkali metal cation containing electrolyte salt.

6. A quasi-salt inorganic ionic liquid mixture according to claim 1, wherein said electrolyte additive is an alkali metal cation containing electrolyte salt.

7. A quasi-salt inorganic ionic liquid mixture according to claim 1, wherein said electrolyte additive is selected from the group consisting of LiAlCl$_4$, LiN(SO$_2$CF$_3$)$_2$, LiSO$_3$CF$_3$, NaACl$_4$, NaN(SO$_2$CF$_3$)$_2$ and NaSO$_3$CF$_3$.

8. A quasi-salt inorganic ionic liquid mixture according to claim 1, wherein said inorganic halide-donating molecule is:

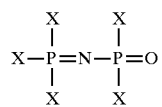

wherein X is a halogen atom.

9. A quasi-salt inorganic ionic liquid mixture according to claim 8, wherein said strong Lewis acid is selected from the group consisting of AlCl$_3$, BCl$_3$, SbCl$_3$ and FeCl$_3$.

10. A quasi-salt inorganic ionic liquid mixture according to claim 9, wherein said electrolyte additive is an alkali metal cation containing electrolyte salt.

11. A quasi-salt inorganic ionic liquid mixture according to claim 10, wherein said electrolyte additive is selected from the group consisting of LiAlCl$_4$, LiN(SO$_2$CF$_3$)$_2$, LiSO$_3$CF$_3$, NaAlCl$_4$, NaN(SO$_2$CF$_3$)$_2$ and NaSO$_3$CF$_3$.

12. A quasi-salt inorganic ionic liquid mixture according to claim 1, wherein said inorganic halide-donating molecule is:

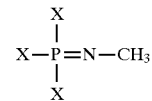

wherein X is a halogen atom.

13. A quasi-salt inorganic ionic liquid mixture according to claim 12, wherein said strong Lewis acid is selected from the group consisting of AlCl$_3$, BCl$_3$, SbCl$_3$ and FeCl$_3$.

14. A quasi-salt inorganic ionic liquid mixture according to claim 13, wherein said electrolyte additive is an alkali metal cation containing electrolyte salt.

15. A quasi-salt inorganic ionic liquid mixture according to claim 14, wherein said electrolyte additive is selected from the group consisting of LiAlCl$_4$, LiN(SO$_2$CF$_3$)$_2$, LiSO$_3$CF$_3$, NaAlCl$_4$, NaN(SO$_2$CF$_3$)$_2$ and NaSO$_3$CF$_3$.

16. A quasi-salt inorganic ionic liquid mixture according to claim 1, wherein said inorganic halide-donating molecule is:

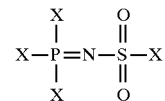

wherein X is a halogen atom.

17. A quasi-salt inorganic ionic liquid mixture according to claim 16, wherein said strong Lewis acid is selected from the group consisting of AlCl$_3$, BCl$_3$, SbCl$_3$ and FeCl$_3$.

18. A quasi-salt inorganic ionic liquid mixture according to claim 17, wherein said electrolyte additive is an alkali metal cation containing electrolyte salt.

19. A quasi-salt inorganic ionic liquid mixture according to claim 18, wherein said electrolyte additive is selected from the group consisting of LiAlCl$_4$, LiN(SO$_2$CF$_3$)$_2$, LiSO$_3$CF$_3$, NaAlCl$_4$, NaN(SO$_2$CF$_3$)$_2$ and NaSO$_3$CF$_3$.

20. A quasi-salt inorganic ionic liquid mixture according to claim 1, wherein said inorganic halide-donating molecule is:

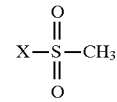

wherein X is a halogen atom.

21. A quasi-salt inorganic ionic liquid mixture according to claim 20, wherein said strong Lewis acid is selected from the group consisting of AlCl$_3$, BCl$_3$, SbCl$_3$ and FeCl$_3$.

22. A quasi-salt inorganic ionic liquid mixture according to claim 21, wherein said electrolyte additive is an alkali metal cation containing electrolyte salt.

23. A quasi-salt inorganic ionic liquid mixture according to claim 22, wherein said electrolyte additive is selected from the group consisting of LiAlCl$_4$, LiN(SO$_2$CF$_3$)$_2$, LiSO$_3$CF$_3$, NaACl$_4$, NaN(SO$_2$CF$_3$)$_2$ and NaSO$_3$CF$_3$.

24. A quasi-salt inorganic ionic liquid mixture according to claim 1, wherein said inorganic halide-donating molecule is:

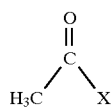

wherein X is a halogen atom.

25. A quasi-salt inorganic ionic liquid mixture according to claim 24, wherein said strong Lewis acid is selected from the group consisting of $AlCl_3$, $BCl_3$, $SbCl_3$ and $FeCl_3$.

26. A quasi-salt inorganic ionic liquid mixture according to claim 25, wherein said electrolyte additive is an alkali metal cation containing electrolyte salt.

27. A quasi-salt inorganic ionic liquid mixture according to claim 26, wherein said electrolyte additive is selected from the group consisting of $LiAlCl_4$, $LiN(SO_2CF_3)_2$, $LiSO_3CF_3$, $NaAlCl_4$, $NaN(SO_2CF_3)_2$ and $NaSO_3CF_3$.

28. A quasi-salt inorganic ionic liquid mixture according to claim 1, wherein said inorganic halide-donating molecule is:

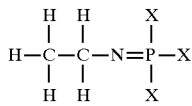

wherein X is a halogen atom.

29. A quasi-salt inorganic ionic liquid mixture according to claim 28, wherein said strong Lewis acid is selected from the group consisting of $AlCl_3$, $BCl_3$, $SbCl_3$ and $FeCl_3$.

30. A quasi-salt inorganic ionic liquid mixture according to claim 29, wherein said electrolyte additive is an alkali metal cation containing electrolyte salt.

31. A quasi-salt inorganic ionic liquid mixture according to claim 30, wherein said electrolyte additive is selected from the group consisting of $LiAlCl_4$, $LiN(SO_2CF_3)_2$, $LiSO_3CF_3$, $NaAlCl_4$, $NaN(SO_2CF_3)_2$ and $NaSO_3CF_3$.

32. An electrochemical device having a quasi-salt inorganic ionic liquid mixture according to claim 1.

33. An electrochemical device according to claim 32, wherein said strong Lewis acid is selected from the group consisting of $AlCl_3$, $BCl_3$, $SbCl_3$ and $FeCl_3$.

34. An electrochemical device according to claim 33, wherein said electrolyte additive is an alkali metal cation containing electrolyte salt.

35. An electrochemical device according to claim 33, wherein said electrolyte additive is selected from the group consisting of $LiAlCl_4$, $LiN(SO_2CF_3)_2$, $LiSO_3CF_3$, $NaAlCl_4$, $NaN(SO_2CF_3)_2$ and $NaSO_3CF_3$.

36. An electrochemical device according to claim 32, wherein said electrolyte additive is an alkali metal cation containing electrolyte salt.

37. An electrochemical device according to claim 32, wherein said electrolyte additive is selected from the group consisting of $LiAlCl_4$, $LiN(SO_2CF_3)_2$, $LiSO_3CF_3$, $NaAlCl_4$, $NaN(SO_2CF_3)_2$ and $NaSO_3CF_3$.

38. An electrochemical device according to claim 32, wherein said inorganic halide-donating molecule is:

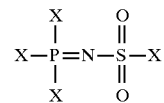

wherein X is a halogen atom.

39. An electrochemical device according to claim 38, wherein said strong Lewis acid is selected from the group consisting of $AlCl_3$, $BCl_3$, $SbCl_3$ and $FeCl_3$.

40. An electrochemical device according to claim 39, wherein said electrolyte additive is an alkali metal cation containing electrolyte salt.

41. An electrochemical device according to claim 39, wherein said electrolyte additive is selected from the group consisting of $LiAlCl_4$, $LiN(SO_2CF_3)_2$, $LiSO_3CF_3$, $NaAlCl_4$, $NaN(SO_2CF_3)_2$ and $NaSO_3CF_3$.

42. An electrochemical device according to claim 38, wherein said electrolyte additive is an alkali metal cation containing electrolyte salt.

43. An electrochemical device according to claim 38, wherein said electrolyte additive is selected from the group consisting of $LiACl_4$, $LiN(SO_2CF_3)_2$, $LiSO_3CF_3$, $NaAlCl_4$, $NaN(SO_2CF_3)_2$ and $NaSO_3CF_3$.

* * * * *